(12) United States Patent
Zhizhimontov

(10) Patent No.: US 11,467,182 B1
(45) Date of Patent: Oct. 11, 2022

(54) SCANNING PROBE MICROSCOPE WITH USE OF COMPOSITE MATERIALS

(71) Applicant: Vladimir Zhizhimontov, Santa Barbara, CA (US)

(72) Inventor: Vladimir Zhizhimontov, Santa Barbara, CA (US)

( * ) Notice: Subject to any disclaimer, the term of this patent is extended or adjusted under 35 U.S.C. 154(b) by 504 days.

(21) Appl. No.: 16/532,463

(22) Filed: Aug. 5, 2019

Related U.S. Application Data

(60) Provisional application No. 62/714,772, filed on Aug. 6, 2018.

(51) Int. Cl.
| | |
|---|---|
| *G01Q 70/14* | (2010.01) |
| *G01Q 10/04* | (2010.01) |
| *G01Q 60/00* | (2010.01) |
| *G01Q 60/30* | (2010.01) |
| G02B 21/00 | (2006.01) |
| C01F 7/02 | (2022.01) |
| C01B 33/12 | (2006.01) |
| C01B 32/956 | (2017.01) |
| C01B 32/25 | (2017.01) |
| C01B 32/158 | (2017.01) |
| C01B 32/991 | (2017.01) |

(52) U.S. Cl.
CPC ............ *G01Q 70/14* (2013.01); *G01Q 10/04* (2013.01); *G01Q 60/00* (2013.01); *G01Q 60/30* (2013.01); *C01B 32/158* (2017.08); *C01B 32/25* (2017.08); *C01B 32/956* (2017.08); *C01B 32/991* (2017.08); *C01B 33/12* (2013.01); *C01F 7/02* (2013.01); *G02B 21/002* (2013.01); *Y10T 428/252* (2015.01)

(58) Field of Classification Search
CPC ........ G01Q 70/14; G01Q 10/04; G01Q 60/00; G01Q 60/30; Y10T 428/252; C01B 32/158; C01B 32/956; C01B 32/991; C01B 32/25; C01B 33/12; C01F 7/02; G02B 21/002
USPC .................................. 850/52, 53, 55, 56, 59
See application file for complete search history.

(56) References Cited

U.S. PATENT DOCUMENTS

| | | | |
|---|---|---|---|
| 2011/0256476 A1* | 10/2011 | Hori ................... | G03G 9/08795 430/105 |
| 2019/0118508 A1* | 4/2019 | Saito ...................... | H05K 1/03 |

* cited by examiner

*Primary Examiner* — Nicole M Ippolito

(57) ABSTRACT

Scanning Probe Microscope (SPM) system configured with the use of a composite material employing a non-metallic matrix and at least one of diamond particles, fused silica particles, boron carbide particles, silicon carbide particles, aluminum oxide particles, carbon fiber elements, carbon nanotube elements, and doped diamond particles to increase the structural integrity and/or strength of the SPM system, and a fraction of reinforcement ranging from at least 25% to at least 75% with advantageous modification of the Young's modulus, coefficient of thermal expansion, and thermal conductivity.

20 Claims, 1 Drawing Sheet

SCANNING PROBE MICROSCOPE WITH USE OF COMPOSITE MATERIALS

CROSS-REFERENCE TO RELATED APPLICATIONS

This application claims the priority from and the benefit of U.S. Provisional Application Ser. No. 62/714,772, filed Aug. 6, 2018, the disclosure of which is incorporated by reference herein.

TECHNICAL FIELD AND RELATED ART

The present invention relates generally to microscopy and, more particularly, to using an artificial composite material with a non-metallic matrix and different elements configured as structural reinforcements in a design of a scanning probe microscope (SPM). Such an approach allows improving different specifications of SPM including to get a higher rigidity, higher resonant frequencies of a measuring loop, high damping, low drift, and lower costs. Additionally, the approach allows manufacturing such shapes of parts which cannot be produced by traditional production techniques used for SPMs such as machining of metal alloys. This allows to use more efficient approaches to a design of parts and to simplify an assembling procedure.

Scanning Probe Microscopes (SPMs) are used to measure and image with high resolution different material properties such as surface topography, rigidity, adhesion, magnetic and electric forces, and electrical conductivity, to name just a few. In some applications it is possible to achieve even atomic resolution while measuring with the same SPM hundred-micron features of sample surfaces. The use of SPM provides a three-dimensional image of a surface, which is an advantage in comparison with the use of many other types of microscopes that are capable of providing only two-dimensional images.

Different types of SPMs were developed since the introduction of Scanning Tunneling Microscope (STM) in 1981 and Atomic Force Microscope (AFM) in 1985.

Most of commercial SPMs use a piezoelectric or voice coil scanner to position a probe over a sample or a sample over a probe and collect data during scanning of a sample surface with the probe. As a probe they usually use a cantilever with a sharp tip on its free end and measure a deflection of the cantilever to control an interaction force between the probe and the surface. The probe can operate in different modes, which are typically operationally divided into contact modes and dynamic modes. In a contact mode, the probe touches the surface of the sample and scans over the surface while usually keeping constant the deflection and, hence, a force of interaction with the sample. There are different dynamic modes of operation, and in one of them the cantilever vibrates on a resonant frequency and touches the surface only during short time of each cycle of oscillations and scan over the surface usually keeping constant the amplitude of oscillations.

There are several approaches to organize the process of scanning the sample, including the one in which a three-dimensional XYZ scanner is configured to move the sample with respect to the probe, the one in which the three-dimensional XYZ scanner is configured to move the probe, and possibly the hybrid version (in which both the probe and the sample can be moved). The scanner may include several sub-scanner systems which can have different specifications, e.g. they can have different resonant frequencies, one of the scanners can have larger scanning range and lower resonant frequencies (these properties are correlated) and the second one for the same axis can have smaller scanning range and higher resonant frequencies.

Depending on an approach to the SPM design, main elements of the SPM which are a body or frame, the scanner or scanners, the sample, a registration system (which can be a part of the probe, e.g. a piezoresistive probe or a probe with a capacitive sensor), a positioner which brings the sample and the probe in interaction, and control system can be connected in different ways known in related art.

To obtain accurate positioning of the probe over the sample, a measuring loop (which includes substantially all mechanical elements of a typical SPM, from sample to the probe) has to keep a stable position of the probe with respect to the sample during measurements. The design of the SPM has to provide high resonant frequencies of the measuring loop, high rigidity, and low mutual drift the probe and the sample. The high resonant frequencies and rigidity provide a high level of vibration and an acoustic isolation which are very important specially to obtain an atomic resolution. To achieve these goals, it is necessary to use materials with high Young modulus, high speed of sound, high coefficient of damping, low coefficient of thermal expansion (CTE), and high thermal conductivity to provide homogeneous temperature over the measuring loop.

SUMMARY

According to the idea of the invention, embodiments are directed to a scanning probe microscope system (such as an AFM system, in one example) that are constructed with the use of artificial composite materials that incorporate diamond, fused silica or other appropriate materials and their mixtures as reinforcement elements in such composite materials with a non-metallic matrix. For purposes of this application the term "artificial" means and defines "man-made". An advantageous outcome from such an approach is operational flexibility in choosing and providing necessary properties (material and/or otherwise) for parts of the target SPM system—especially properties of the body or frame and other large parts. Preferably, the choice of a combination of the used materials is made to provide maximum homogeneity of the measuring loop portion of the SPM system. The corollary benefit from implementing the idea of the invention is a significantly reduced cost of production of the SPM system and a new approach to design (as compared with related art).

Embodiments of the invention provide a scanning probe microscope system at least one of the structural elements of which contains a composite material including a non-metallic matrix reinforced with at least one of diamond particles, fused silica particles, boron carbide particles, silicon carbide particles, aluminum oxide particles, carbon fiber elements, carbon nanotube elements, and doped diamond particles. The non-metallic matrix may include at least one of the following: a polymer matrix, a glass matrix, a ceramic matrix, and a glass-ceramic matrix.

DETAILED DESCRIPTION

Figure 1:
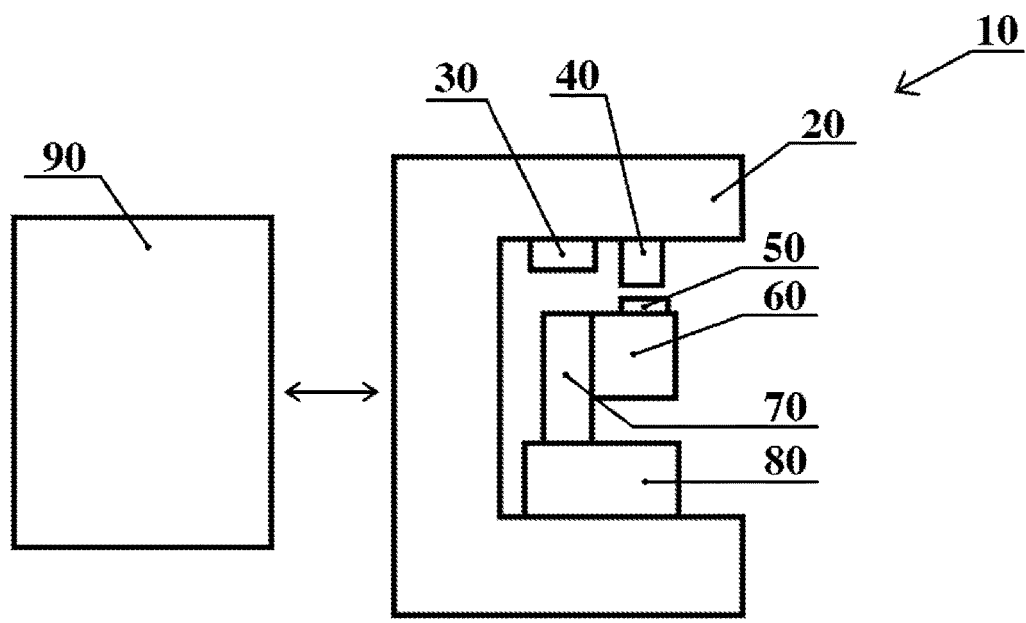
FIG. 1 is a schematic simplified design of a typical SPM configured according to one embodiment.

FIG. 1 schematically illustrates one typical embodiment of the SPM 10, where the three-dimensional XYZ scanner 60 is mounted on the Z mechanical positioner 70. The Z positioner 70 is mounted on the XY mechanical positioner 80 which is mounted on the body 20. The sample 50 is mounted on the scanner 60. The probe 40 and the registration system 30 are mounted on the body 20. The Z positioner 70 brings the sample 50 in an interaction with the probe 40. The scanner 60 scans with the sample 50 in XY directions and keeping the probe 40 with Z scanner movement in the appropriate interaction with the sample 50 using the control system 90.

Figure 2:
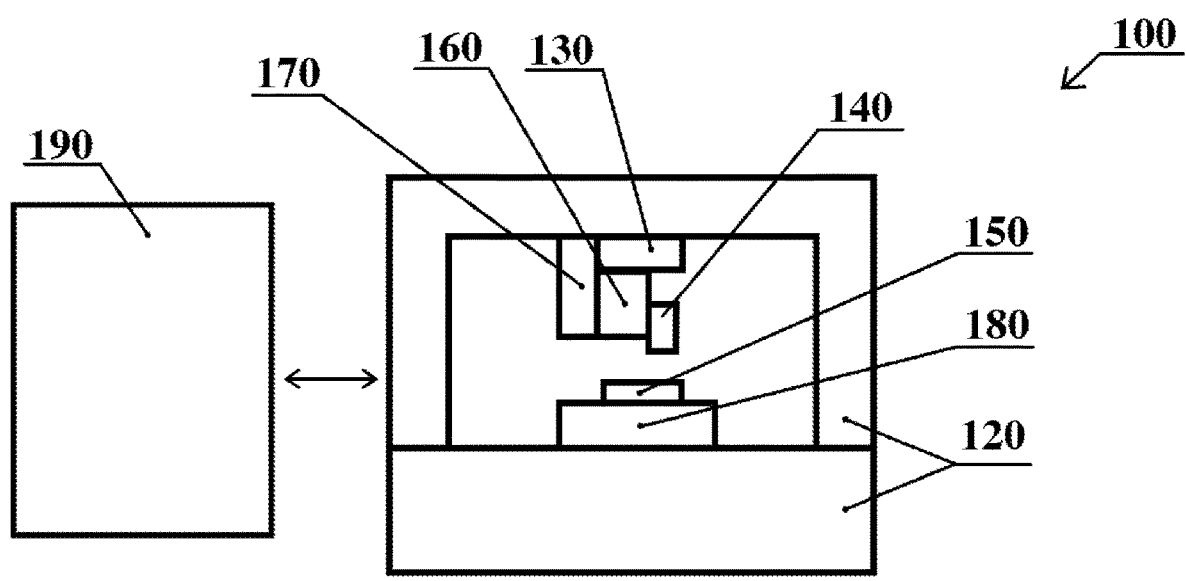
FIG. 2 illustrates a related embodiment of the SPM.

In another embodiment of the SPM 100, depicted in FIG. 2, the sample 150 is mounted on the XY mechanical positioner 180, and the XY positioner 180 is mounted on the body 120. The probe 140 is affixed to the three-dimensional XYZ scanner 160. The scanner 160 and the registration system 130 are cooperated with the Z positioner 170. In another approach the scanner 160 and the registration system 130 can form a united assembly, which is mounted on the Z positioner 170. In operation, the Z positioner 170 brings the probe 140 in the interaction with the sample 150. The scanner 160 (with the probe 140) is configured to scan in XY directions while keeping the probe 140 with Z scanner movement in the appropriate interaction with the sample 150 using the control system 190.

As a skilled person will readily appreciate, only main elements of the typical SPM system are described in reference to FIGS. 1 and 2. Other additional elements of construction can be and often are added, depending on the specifics of the implementation of an SPM. For example, a probe oscillator can be added with appropriate changes in the control system to realize the dynamic operation of the SPM.

As aggregate experience of the related art shows, the operational characteristics of substantially any SPM system are often dependent of the material characteristics of such system. For example, to obtain accurate positioning the probe over the sample, a measuring loop (which includes all described mechanical elements of the SPM from sample to the probe) has to keep a stable position of the probe with respect to the sample during measurements. The design of the SPM has to provide high resonant frequencies of the measuring loop, high rigidity, and low mutual drift the probe and the sample. To achieve these goals, it is necessary to use materials with high Young modulus, high speed of sound, high damping, low coefficient of thermal expansion (CTE), and high thermal conductivity to provide homogeneous temperature over the measuring loop. Usually it is difficult to find all these properties in one material. For example, Invar (a steel alloy, a registered trademark of lmphy Alloys of Puteaux, France) has a very low CTE $1.2 \times 10^{-6}$ 1/K, but the thermal conductivity is low, and additionally, it is expensive.

Aluminum alloys have the very good thermal conductivity and the high sound speed, but the CTE $23 \times 10^{-6}$ 1/K is very high. In one approach, described in U.S. Pat. No. 9,116,168, parts of a body, a bridge, and Z positioner of the SPM system are formed from aluminum. To compensate for high drift caused by the high aluminum CTE, an active compensation with heating was employed with electronic control. Providing very good specifications, the resulting system was characterized by long transient time after turning on due to high heat capacity of the bridge. In practice, such operational characteristics implies that it is substantially impossible to obtain low drift at once after turning the system on.

While diamond—which has a very high Young's modulus, high sound speed, high thermal conductivity and low CTE—may lend itself as an advantageous material for the constructions of the SPM system, it remains very expensive (even in an artificial form) and there are substantially no industrial ways to process it.

Other good materials are quartz and fused silica. These materials have the CTEs the value of which are close to zero. In this situation the thermal conductivity is not so important because even having different temperatures in different part of the construction, the thermal drift will be close to zero. And again, it is very difficult to process it and create an appropriate design.

According to the idea of the invention, embodiments are directed to a scanning probe microscope system (such as an AFM system, in one example) that are constructed with the use of artificial composite materials that incorporate diamond, fused silica or other appropriate materials and their mixtures as reinforcement elements in such composite materials with a non-metallic matrix. An advantageous outcome from such an approach is operational flexibility in choosing and providing necessary properties (material and/or otherwise) for parts of the target SPM system—especially properties of the body or frame and other large parts. Preferably, the choice of combination of the used materials is made to provide maximum homogeneity of the measuring loop portion of the SPM system. The corollary benefit from implementing the idea of the invention is a significantly reduced cost of production of the SPM system (as compared with related art).

In one embodiment, at least one of the SPM components or sub-systems is manufactured from a composite material that includes diamond particles as reinforcement additive. The resulting material is characterized by the highest rigidity, resonant frequencies of the SPM measuring loop, the highest thermal conductivity and very low thermal drift all of which are provided by the diamond additive portion. For example, if there is a local source of heat, the high thermal conductivity provides fast temperature equalizing, and the low CTE provides a low change of dimensions of SPM parts made from the composite material, especially the body or frame.

In a related embodiment, some of the SPM parts are manufactured from a composite material with fused silica particles. It can be quartz, too. The fused silica has the CTE about $0.56 \times 10^{-6}$ 1/K. It provides the low CTE of the composite and appropriately the low thermal drift. For example, if there is a local source of heat, the low CTE provides low change of dimensions of SPM parts made from the composite material, especially the body or frame as the most extended part.

Particles of aluminum oxide, boron carbide, silicon carbide and other materials which includes different kinds of oxides, nitrides and carbides, and fullerene can be used as reinforcement particles. Different metals such as aluminum, titanium and so on can be reinforcement particles too. It can be also a mixture of different particles to provide an opportunity to create the composite materials with appropriate properties which are necessary. For example, using or/and adding metals or doped diamond can provide an electrical conductivity. Such a material can be used to provide electrical shielding, heating and so on. All these types of reinforcement (possibly excluding the doped diamond) provide cheaper composites with very good properties.

In yet another related embodiment, some of the SPM parts are manufactured from a composite material with fiber reinforcement. The fibers can be fiberglass (fused silica is a preferred glass, but could be any different types of glasses), glass-ceramics, carbon, boron, aluminum oxide, boron carbide, silicon carbide and other materials which includes different kinds of oxides, nitrides and carbides, carbon nanotubes or any other nanotubes.

Non-metallic matrix materials that can be used in the SPM design according to the idea of the invention may include polymer, glass, glass-ceramics, and ceramics (for material properties—see Chawla, Krishan K., *Composite Materials Science and Engineering*, Springer, 2012, 3rd Edition)

The polymer matrix can be produced with different types of polymers. The most important polymers for this case are thermoplastics and thermosets. Thermoplastics can be softened or melt on heating. Examples are nylon (polyamide), polystyrene, low- and high-density polyethylene, and polymethyl methacrylate. Thermosetting polymers have cross-linked molecules and they do not soften on heating. Examples are epoxy, polyester, and vinyl ester.

For the glass matrix different types of glasses can be used. One of the main parameters of glasses is a softening temperature which has to be low enough to provide a stable state of the reinforcement. For example, diamond has an ignition point in air in a range from 690° C. to 840° C., thus the glass has to have the softening temperature below this point to process the composite in air. For diamond composite silicon oxide glasses are used which contain lead and zinc and have a low CTE to match to the diamond CTE about $1\times10^{-6}$ 1/K. Glasses with zinc have the lowest CTE $(6-7)\times10^{-7}$ 1/K. Another option may be provided by silicon oxide carbides (SiOC) glasses or glass ceramics (which are discussed in, for example, P. Sellappan et al., SiOC Glass-Diamond Composites, J. Am. Ceram. Soc., 95 [2] pp. 545-552, 2012).

In another embodiment, some of the SPM parts are manufactured from at least two layers of different composite materials. For example, one layer can provide high stiffness and another high thermal conductivity.

Properties of a particulate composite material formed according to an embodiment of the invention can be assessed with an approach of McGee and McCullough (see "Combining Rules for Predicting the Thermoelastic Properties of Particulate Filled Polymers, Polyblends, and Foams", in *Polymer Composites*, 1981, v. 2, No. 4), with the following equations:

$$P^* = \frac{P_m(1+\xi_{Pl}\chi_{Pl}V_f)}{1-\psi V_f\chi_{Pl}} \quad (P=K \text{ or } G) \quad (1)$$

$$\chi_{Pl} = \frac{P_f - P_m}{P_f + \xi_{Pl}P_m} \quad (2)$$

$$\psi = 1 + \frac{V_f V_m (1-\gamma V_m)(P_f - P_m)(\xi_{Pu} - \xi_{Pl})}{P_f + \xi_{Pu}(V_f P_f + V_m P_m)} \quad (3)$$

$$(0 \le V_f, V_m \le 1, V_f + V_m = 1)$$

$$\gamma = \frac{2\phi_c - 1}{\phi_c} \quad (4)$$

$$\xi_{Pl} = \frac{2(1-2\sigma_m)}{1+\sigma_m}; \xi_{Pu} = \frac{2(1-2\sigma_f)K_f}{(1+\sigma_f)K_m} \text{ (for bulk modulus, } K\text{)} \quad (5)$$

$$\xi_{Pl} = \frac{7-5\sigma_m}{8-10\sigma_m}; \xi_{Pu} = \frac{(7-5\sigma_f)G_f}{(8-10\sigma_f)G_m} \text{ (for shear modulus, } G\text{)} \quad (6)$$

$$K = \frac{E}{3(1-2\sigma)}; G = \frac{E}{2(1+\sigma)} \quad (7)$$

$$E^* = \frac{9K^*G^*}{3K^* + G^*} \quad (8)$$

$$\alpha^* = V_f\alpha_f + V_m\alpha_m + \frac{\alpha_m - \alpha_f}{K_f - K_m}K_fK_m\left(\frac{1}{K^*} - \left(\frac{V_f}{K_f} + \frac{V_m}{K_m}\right)\right) \quad (9)$$

$$\rho^* = \rho_f V_f + \rho_m V_m \quad (10)$$

$$k^* = k_f V_f + k_m V_m \quad (11)$$

Hereinafter, the indices f, m and * denote appropriate values for the reinforcement, matrix and composite. P is the bulk modulus, K, or the shear modulus, G. $V_f$ and $V_m$ is the volume fraction of the reinforcement and matrix with $V_f + V_m = 1$. $\phi_c$ is a critical volume fraction and is taken for calculations as the maximum packing fraction for 'random' close packing of the particulate, $\phi_c = 2/3$. The maximum value $\phi_c$ cannot exceed $V_f^{max} = 0.74$ for hexagonal close packing for spherical particles. Parameters $\xi_{Pl}$ and $\xi_{Pu}$ differ for calculation of K and G of composite and can be evaluated according to equations (5) and (6). E and σ are the Young's modulus and Poisson's ratio, and equations (7), (8) are the usual relations connecting E, K and G (known from, for example, Landau and Lifshitz, *Theory of Elasticity*, Butterwoth-Heinemann, Third Edition, 1999). α, ρ and k are, respectively, the CTE, density and thermal conductivity.

Taking data for SiOC glass matrix composite, known in related art, and considering this composite to be reinforced with diamond particles with the particle size of 2 μm, with diamond Young's modulus 1000 GPa and Poisson's ratio 0.2, and 96 GPa and 0.11 for $SiO_{1.6}C_{0.8}$ glass appropriately, for properties prediction, we can estimate the composite Young's modulus 141.5 GPa for 20% (volume fraction) reinforcement ($V_f = 0.2$) and 157.5 GPa for 25% (volume fraction) reinforcement. References to % reinforcement made in this application represent volume fractions. Comparison with experimental data 140.7 GPa and 154 GPa from the above-mentioned article by Sellappan appropriately shows very good correspondence between the theory and experiment. It is possible to obtain fraction of reinforcement up to 75%. For 50% the composite Young's modulus 284 GPa and density 2675 kg/m³. Densities of the diamond and glass used for calculation are 3150 and 2150 kg/m³. The sound speed in rod $$\sqrt{\frac{E^*}{\rho^*}}$$

will be 10.3 km/sec. Using such a material with Young's modulus higher than steel modulus and with density lower the aluminum one, it is possible to design the SPM frame with high stiffness and high resonant frequencies. Using such materials for components of positioners, measuring heads and other parts of the SPM can provide further improvement of specifications.

Additionally, SiOC glass (or glass-ceramics) matrix provides a low CTE, which varies from about $1\times10^{-7}$ to $5\times10^{-6}$ 1/K for different stoichiometry and can match to the diamond CTE about $1\times10^{-6}$ 1/K. For $SiO_{1.41}C_{0.3}$, the average CTE from 20 to 100° C. can be estimated to be as low as $1\times10^{-7}$ 1/K. Interpolating data for the Young's modulus and Poisson's ratio from the book by P. Colombo, *Polymer derived Ceramics: From Nano-structure to Applications*, DEStech Publication, 2010, p. 242, it is possible to estimate for this stoichiometry the Young's modulus 90.4 GPa. The diamond composite with this glass matrix will have for 25% reinforcement the Young's modulus and CTE 150 GPa and $5.2 \times 10^{-7}$ 1/K, and for 50% 272 GPa and $7.8 \times 10^{-7}$ 1/K. Estimation for the thermal conductivity according to a rule of mixture (eq. 11) gives 301 W/(m K) for 25% and 600 W/(m K) for 50% reinforcement. The thermal conductivity of synthetic diamond varies from 1200 to 2000 W/(m K). For the calculation the worst case was selected. The thermal conductivity of SiOC is 1.36 W/(m K) at room temperature.

Combination of very high Young's modulus, low CTE and high thermal conductivity makes materials similar to glass-diamond composites very promising for SPM design.

The above equation allows estimating properties of composites with a polymer matrix. As a rule, the polymer matrix with the particulate reinforcement has a lower Young's modulus and thermal conductivity, and higher CTE than glass or glass-ceramics matrices. Nevertheless, such composites can be a cheaper alternative to the glass matrix, providing reasonably good properties.

A composite from epoxy with Young's modulus 3.5 GPa and CTE $56 \times 10^{-6}$ 1/K with diamond can provide the Young's modulus 25 GPa with 60% reinforcement, CTE about $12 \times 10^{-6}$ 1/K. Although epoxy EP30LTE-2 (Bond Master) has CTE $(10-13) \times 10^{-6}$ 1/K. It gives $3.3 \times 10^{-6}$ 1/K for the composite. If to increase the reinforcement up to 70%, the Young's modulus can reach 43 GPa. Such a material is comparable to a stiffness of aluminum with Young's modulus 70 GPa, but has a very low CTE and high thermal conductivity 720 W/(m K). For estimation was used a usual epoxy thermal conductivity about 0.15 W/(m K).

Using fused silica as a reinforcement with Young's modulus 72 GPa and CTE $5.5 \times 10^{-7}$ 1/K and epoxy EP30LTE-2, the composite can show good CTE $3.7 \times 10^{-6}$ 1/K and reasonable Young's modulus 16 GPa with 60% reinforcement.

Other non-metallic matrices and reinforcement materials, particles and fibers, or mixture of different particles and/or fibers can be used. An estimation for fiber reinforcement can be performed according to methodology described by Chawla. The fiber or whisker reinforced composites have orthotropic properties, but this one preferential direction with a high Young's modulus, low CTE and high thermal conductivity can be used for extended elements such as e.g. a bridge which is a top part of body 120 at FIG. 2.

A skilled artisan will readily appreciate, therefore, that, referring again to FIGS. 1 and/or 2, in different embodiment of the SPM at least one part of the body 20 and/or the body 120 is fabricated from the artificial composite material discussed above.

Depending on the specifics of a particular design, in different related implementations, at least one part of the body 20 is made from at least one artificial composite material with a non-metallic matrix and/or at least one part of Z positioner 70 is made from at least one artificial composite material with a non-metallic matrix and/or at least one part of XY mechanical positioner 80 is made from at least one artificial composite material with a non-metallic matrix.

In yet another embodiment, at least one part of scanner 60 is constructed from at least one artificial composite material with a non-metallic matrix and/or at least one part of registration system 30 is made from at least one artificial composite material with a non-metallic matrix.

In further implementations, additionally in the alternative, at least one part of the body 120 is made from at least one artificial composite material with a non-metallic matrix and/or at least one part of Z positioner 170, at least one part of XY mechanical positioner 180, at least one part of the scanner 160 and/or at least one part of registration system 130 is made from at least one artificial composite material with a non-metallic matrix. Regardless of a particular embodiment, the artificial composite material with a non-metallic matrix includes a composite material with additions (reinforcing elements) that include at least one of the following materials: diamond particles, fused silica particles, carbon fibers, fiberglass elements, carbon nanotubes, and combinations of any of the above-mentioned reinforcing elements. For example, in one embodiment of the SPM system, the body (20, 120) of the SPM includes a composite material incorporating at least one of the following: diamond particles, fused silica particles, carbon fibers, fiberglass elements, and carbon nanotubes.

In the next implementation, the composite material used in construction of at least one of such parts as the Z-positioner 70 and the XY positioner 80 includes at least one of the following materials: diamond particles, fused silica particles, carbon fibers, fiberglass elements, and carbon nanotubes.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Various changes and modifications may be made within the scope of the present invention without departing from the spirit thereof, and the scope of the invention includes all such modifications.

I claim:

1. A scanning probe microscope (SPM) comprising:
a body and
a repositioning system including at least a Z-positioner and an XY-mechanical positioner,
wherein at least one component of the SPM is made from an artificial composite material employing a non-metallic matrix, with the artificial composite material being a man-made material.

2. An SPM according to claim 1, wherein at least one part of the body is made from said artificial composite material.

3. An SPM according to claim 1, wherein at least one part of the Z positioner is made from said artificial composite material.

4. An SPM according to claim 1, wherein at least one part of the XY mechanical positioner is made from said artificial composite material.

5. An SPM according to claim 1, further comprising a scanner system, wherein at least one part of the scanner system is made from said artificial composite material.

6. An SPM according to claim 1, further comprising a registration system is at least one structural element of which is made from said artificial composite material.

7. An SPM according to claim 1, further comprising a registration system, wherein at least one part of at least one of the following parts: the Z positioner, XY mechanical positioner, scanner, and registration system is made from said artificial composite material.

8. An SPM according to claim 1, wherein said artificial composite material contains at least diamond particles configured as structural reinforcements.

9. An SPM according to claim 1, wherein said artificial composite material contains with at least fused silica particles configured as structural reinforcements.

10. An SPM according to claim 1, wherein said artificial composite material contains at least boron carbide particles configured as structural reinforcements.

11. An SPM according to claim 1, wherein said artificial composite material contains at least silicon carbide particle configured as structural reinforcements.

12. An SPM according to claim 1, wherein said artificial composite material contains at least aluminum oxide particles configured as structural reinforcements.

13. An SPM according to claim 1, wherein said artificial composite material contains at least carbon fibers configured as structural reinforcements.

14. An SPM according to claim 1, wherein said artificial composite material contains at least fused silica fibers configured as structural reinforcements.

15. An SPM according to claim 1, wherein said artificial composite material contains at least carbon nanotubes configured as structural reinforcements.

16. An SPM according to claim 1, wherein said artificial composite material contains at least doped diamond particles configured as structural reinforcements.

17. An SPM according to claim 1, scanning probe microscope comprising as recited in claim 1, wherein said artificial composite material contains a mixture of at least two of the following materials: diamond particles, fused silica particles, boron carbide particles, silicon carbide particles, aluminum oxide particles, carbon fiber elements, carbon nanotube elements, and doped diamond particles configured as structural reinforcement.

18. An SPM according to claim 1, wherein said non-metallic matrix includes a polymer matrix.

19. An SPM according to claim 1, wherein said non-metallic matrix includes at least one of the following matrices: a glass matrix, a glass-ceramic matrix, and a ceramic matrix.

20. An SPM according to claim 1, wherein said composite material includes at least two layers of different composite materials.

* * * * *